(12) United States Patent
Lu et al.

(10) Patent No.: US 10,324,301 B2
(45) Date of Patent: Jun. 18, 2019

(54) 2D/3D SWITCHABLE DISPLAY DEVICE (71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Pengcheng Lu, Beijing (CN); Xue Dong, Beijing (CN); Xiaochuan Chen, Beijing (CN); Wenqing Zhao, Beijing (CN); Jian Gao, Beijing (CN); Ming Yang, Beijing (CN); Qian Wang, Beijing (CN); Lei Wang, Beijing (CN); Rui Xu, Beijing (CN); Xiaochen Niu, Beijing (CN); Haisheng Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/531,715

(22) PCT Filed: Aug. 25, 2016

(86) PCT No.: PCT/CN2016/096679
§ 371 (c)(1),
(2) Date: May 30, 2017

(87) PCT Pub. No.: WO2017/118047
PCT Pub. Date: Jul. 13, 2017

(65) Prior Publication Data
US 2018/0081183 A1 Mar. 22, 2018

(30) Foreign Application Priority Data
Jan. 8, 2016 (CN) .......................... 2016 1 0011896

(51) Int. Cl.
G02F 1/1335 (2006.01)
G02B 27/10 (2006.01)
(Continued)

(52) U.S. Cl.
CPC ....... G02B 27/1066 (2013.01); G02B 27/225 (2013.01); G02F 1/137 (2013.01);
(Continued)

(58) Field of Classification Search
CPC ............. G02F 1/1323; G02F 1/133512; G02F 1/133528; G02F 1/133603;
(Continued)

(56) References Cited

U.S. PATENT DOCUMENTS

2007/0040950 A1* 2/2007 Jung .................... G02B 6/0053
349/5
2010/0060721 A1* 3/2010 Chen ...................... G02B 27/26
348/51
(Continued)

FOREIGN PATENT DOCUMENTS

CN 102466917 A 5/2012
CN 102879911 A 1/2013
(Continued)

OTHER PUBLICATIONS

International Search Report and Written Opinion in PCT/CN2016/096679 dated Dec. 14, 2016, with English translation.
(Continued)

*Primary Examiner* — Thoi V Duong
(74) *Attorney, Agent, or Firm* — Womble Bond Dickinson (US) LLP (57) ABSTRACT

A 2D/3D switchable display device is disclosed. Said 2D/3D switchable display device comprises: a backlight panel, a first liquid crystal display panel at a light emergent side of the backlight panel, and a black-and-white second liquid
(Continued)

crystal display panel at a light emergent side of the first liquid crystal display panel; wherein during 3D display, the second liquid crystal display panel is fully light-transmissive; during 2D display, liquid crystal molecules in the second liquid crystal display panel are arranged irregularly so as to scatter light emitted from the first liquid crystal display panel.

19 Claims, 6 Drawing Sheets

(51) Int. Cl.
| | | |
|---|---|---|
| H04N 13/32 | (2018.01) | |
| H04N 13/383 | (2018.01) | |
| H04N 13/356 | (2018.01) | |
| G02B 27/22 | (2018.01) | |
| G02F 1/13 | (2006.01) | |
| G02F 1/1339 | (2006.01) | |
| G02F 1/137 | (2006.01) | |
| H04N 13/376 | (2018.01) | |
| H04N 13/324 | (2018.01) | |

(52) U.S. Cl.
CPC .......... *G02F 1/1323* (2013.01); *G02F 1/1339* (2013.01); *G02F 1/133504* (2013.01); *G02F 1/133528* (2013.01); *G02F 1/133603* (2013.01); *H04N 13/32* (2018.05); *H04N 13/324* (2018.05); *H04N 13/356* (2018.05); *H04N 13/376* (2018.05); *H04N 13/383* (2018.05); *G02B 27/2214* (2013.01); *G02F 2001/13355* (2013.01); *G02F 2001/13756* (2013.01); *H04N 2213/001* (2013.01)

(58) Field of Classification Search
CPC .. G02F 1/134336; G02F 1/133; G02F 1/1333; G02F 1/1336; G02F 1/133514; G02F 1/133524; G02F 1/133602; G02F 1/133606; G02F 1/1335; G02F 1/133615; G02F 1/1347; G02F 2001/291; G02F 2001/13756; G02F 2203/24; G02F 1/133504; G02F 1/1339; G02F 1/137; G02F 2001/13355; G02B 27/22; G02B 27/225; G02B 27/2207; G02B 27/2228; G02B 2027/0134; G02B 6/0036; G02B 27/1066; G02B 27/2214; H04N 13/356; H04N 13/359; H04N 13/351; H04N 13/261; H04N 13/204; H04N 13/361; H04N 13/00; H04N 13/122; H04N 13/15; H04N 2005/2255; H04N 2013/403; H04N 2013/405; H04N 5/2256; H04N 13/32; H04N 13/383; H04N 13/376; H04N 13/324; H04N 2213/001; G09G 3/36; G09G 2300/023

See application file for complete search history.

(56) References Cited

U.S. PATENT DOCUMENTS

| | | | |
|---|---|---|---|
| 2012/0105771 A1 | 5/2012 | Oka et al. | |
| 2012/0200521 A1* | 8/2012 | Yoshimura | G02B 6/0068 |
| | | | 345/173 |
| 2014/0036173 A1 | 2/2014 | Chang | |
| 2014/0104878 A1 | 4/2014 | Chen et al. | |
| 2014/0111712 A1 | 4/2014 | Wu | |
| 2016/0234488 A1 | 8/2016 | Zhao et al. | |

FOREIGN PATENT DOCUMENTS

| | | |
|---|---|---|
| CN | 102981281 A | 3/2013 |
| CN | 103091896 A | 5/2013 |
| CN | 103345087 A | 10/2013 |
| CN | 103728769 A | 4/2014 |
| CN | 103777396 A | 5/2014 |
| CN | 104614863 A | 5/2015 |
| CN | 205404970 U | 7/2016 |

OTHER PUBLICATIONS

"First office action," CN Application No. 201610011896.2 (dated Dec. 26, 2018).

* cited by examiner

2D/3D SWITCHABLE DISPLAY DEVICE

RELATED APPLICATION

The present application is the U.S. national phase entry of PCT/CN2016/096679, with an international filing date of Aug. 25, 2016, which claims the benefit of Chinese Patent Application No. 201610011896.2, filed on Jan. 8, 2016, the entire disclosure of which is incorporated herein by reference.

TECHNICAL FIELD

The present disclosure relates to the technical field of naked-eye 3D display, in particular to a 2D/3D switchable display device.

BACKGROUND

People use their eyes to observe surrounding three-dimensional scenery in daily life. The three-dimensional (3D) display technology is to enable a person to acquire a sense of three-dimensional space by means of the binocular stereo vision principle, and the main principle thereof is to make the left eye and the right eye of a viewer receive different images, and the two images having "binocular parallax" form "a pair of stereo images" owing to a position difference caused by a pupillary distance between the eyes of the viewer, and the "pair of stereo images" are analyzed and merged by the brain to enable the viewer to have a sense of three-dimensionality.

Figure 1:
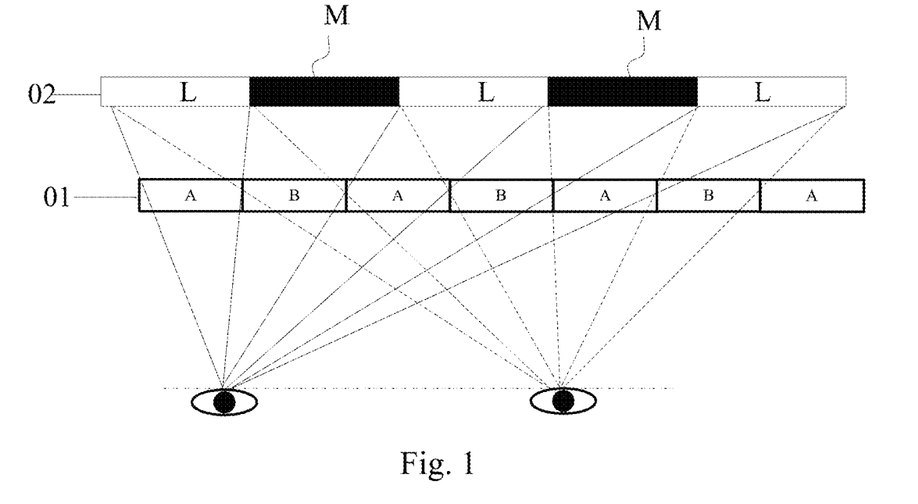
FIG. 1 is a structural diagram of an existing 3D display device.

At present, a schematic diagram of the principle of a 2D/3D switchable display device that can realize naked-eye 3D display is as shown in FIG. 1. A liquid crystal display panel 01 has a left eye pixel region A and a right eye pixel region B that are arranged alternately along a row direction; a backlight panel 02 that serves as the backlight for the liquid crystal display panel 01 has a light-emitting region L and a shading region M arranged alternately along a row direction. During display, light emitted by the light-emitting region L of the backlight panel 02 irradiates towards a direction corresponding to the left eye of a person through the left eye pixel region A of the liquid crystal display panel 01, and irradiates towards a direction corresponding to the right eye of a person through the right eye pixel region B of the liquid crystal display panel 01. When using the liquid crystal display panel 01 for 2D display, the neighboring left eye pixel region A and right eye pixel region B display the same image information. When using the liquid crystal display panel 01 for 3D display, the left eye pixel region A displays left eye image information while the right eye pixel region B displays right eye image information, thereby realizing 2D display and 3D display.

But in the above 2D/3D switchable display device, during 2D display, since the left eye and the right eye can each see only half of the pixels of the liquid crystal display panel 01, the resolution seen by the eyes is halved, and the effect of 2D display is reduced.

Therefore, how to increase the resolution during 2D display in the existing 2D/3D switchable display devices has become a technical problem to be solved by those skilled in the art.

SUMMARY

An embodiment of the present disclosure provides a 2D/3D switchable display device, which increases the resolution of 2D display in existing 2D/3D switchable display devices.

Said 2D/3D switchable display device comprises a backlight panel, a first liquid crystal display panel at a light emergent side of the backlight panel, and a black-and-white second liquid crystal display panel at a light emergent side of the first liquid crystal display panel; wherein during 3D display, the second liquid crystal display panel is fully light-transmissive; and during 2D display, liquid crystal molecules in the second liquid crystal display panel are arranged irregularly so as to scatter light emitted from the first liquid crystal display panel.

Alternatively, in the above 2D/3D switchable display device provided in the embodiments of the present disclosure, the first liquid crystal display panel comprises a first substrate and a second substrate arranged facing each other, and a first liquid crystal layer sandwiched between the first substrate and the second substrate; the second liquid crystal display panel comprises a third substrate and a fourth substrate arranged facing each other, and a second liquid crystal layer sandwiched between the third substrate and the fourth substrate; wherein the first substrate is at a side near the backlight panel; the third substrate is at a side near the second substrate; the first liquid crystal display panel further comprises a first polarizer at a side of the first substrate facing the backlight panel, and a second polarizer at a side of the second substrate facing the third substrate; and the second liquid crystal display panel further comprises a third polarizer at a side of the third substrate facing the second substrate, and a fourth polarizer at a side of the fourth substrate facing away from the second liquid crystal layer.

Alternatively, in the above 2D/3D switchable display device provided in the embodiments of the present disclosure, the second polarizer and the third polarizer are the same polarizer.

Alternatively, in the above 2D/3D switchable display device provided in the embodiments of the present disclosure, light emitted from the backlight panel is white light, the first liquid crystal display panel is a black-and-white liquid crystal display panel, and the first liquid crystal display panel has a number of pixels arranged in a matrix, each pixel including N sub-pixels arranged along a row direction, wherein N is an integer greater than or equal to 3; said 2D/3D switchable display device further comprises a beam splitter, wherein the beam splitter is disposed between the first liquid crystal layer and the backlight panel; light emitted from the backlight panel passes through the beam splitter and is split into light of N colors, and light of each color is transmitted to one sub-pixel of the first liquid crystal display panel.

Alternatively, in the above 2D/3D switchable display device provided in the embodiments of the present disclosure, said beam splitter is at a side of the first substrate facing the first liquid crystal layer.

Alternatively, in the above 2D/3D switchable display device provided in the embodiments of the present disclosure, said beam splitter is at a side of the first polarizer facing the backlight panel.

Alternatively, in the above 2D/3D switchable display device provided in the embodiments of the present disclosure, said beam splitter is between the first polarizer and the first substrate.

Alternatively, in the above 2D/3D switchable display device provided in the embodiments of the present disclosure, said beam splitter is at a side of the backlight panel facing the first liquid crystal display panel.

Alternatively, in the above 2D/3D switchable display device provided in the embodiments of the present disclosure, said backlight panel is an organic electroluminescent panel; wherein said organic electroluminescent panel has a plurality of light-emitting pixels arranged in a matrix, a region corresponding to at least one column of adjacent light-emitting pixels is considered as a column region, and light-emitting column regions and shading column regions are arranged alternately in said organic electroluminescent panel; during display, light-emitting pixels corresponding to said light-emitting column regions emit light while light-emitting pixels corresponding to said shading column regions do not emit light; in the first liquid crystal display panel, a region corresponding to at least one column of pixels is considered as a monocular pixel region, and left-eye pixel regions and right-eye pixel regions are arranged alternately; during 2D display, pixels corresponding to the left-eye pixel regions display the same image information as pixels corresponding to the adjacent right-eye pixel regions; during 3D display, pixels corresponding to the left-eye pixel regions display left-eye image information, while pixels corresponding to the right-eye pixel regions display right-eye image information; light emitted by the light-emitting column regions in said organic electroluminescent panel irradiate towards a direction corresponding to the left eye of a person through the left-eye pixel regions of the first liquid crystal display panel and irradiate towards a direction corresponding to the right eye of a person through the right-eye pixel regions of the first liquid crystal display panel.

Alternatively, the above 2D/3D switchable display device provided in the embodiments of the present disclosure further comprises a human eye tracking and control module; wherein, said human eye tracking and control module controls the monocular pixel regions of the first liquid crystal display panel to translate along a row direction, or controls the column regions of said organic electroluminescent panel to translate along a row direction according to a left-right translation distance of a target human eye.

Alternatively, in the above 2D/3D switchable display device provided in the embodiments of the present disclosure, said human eye tracking and control module comprises a human eye tracking unit for determining a calculated translation distance ΔS of a monocular pixel region in the first liquid crystal display panel according to a translation distance ΔP of the target human eye to the left or to the right as well as $$\frac{\Delta S}{\Delta P} = \frac{H}{L},$$

wherein L is a distance from said target human eye to said organic electroluminescent panel, H is a distance from a liquid crystal layer of said first liquid crystal display panel to said organic electroluminescent panel; a control unit for controlling the monocular pixel regions of said first liquid crystal display panel to translate by an integral number of sub-pixels along the row direction consistent with a human eye moving direction according to the determined calculated translation distance ΔS.

Alternatively, in the above 2D/3D switchable display device provided in the embodiments of the present disclosure, said control unit is used for:

calculating a translation multiple m according to the determined calculated translation distance ΔS as well as $$m = \frac{\Delta S}{\Delta X},$$

wherein ΔX is a width of a column of sub-pixels in the liquid crystal display panel; controlling the monocular pixel regions of the first liquid crystal display panel to translate by m sub-pixels along the row direction if said translation multiple m is an integer; and if said translation multiple m is not an integer, rounding said translation multiple m to obtain m', and controlling the monocular pixel regions of the first liquid crystal display panel to translate by m' sub-pixels along the row direction.

Alternatively, in the above 2D/3D switchable display device provided in the embodiments of the present disclosure, said human eye tracking and control module comprises:

a human eye tracking unit for determining a calculated translation distance ΔS' of a column region of the organic electroluminescent panel according to a translation distance ΔP of the target human eye to the left or to the right as well as $$\frac{\Delta S'}{\Delta P} = \frac{H}{L-H},$$

wherein L is a distance from said target human eye to said organic electroluminescent panel, H is a distance from a liquid crystal layer of said first liquid crystal display panel to said organic electroluminescent panel;

a control unit for controlling the column regions of said organic electroluminescent panel to translate by an integral number of light-emitting pixels along a row direction opposite to a human eye moving direction according to the determined calculated translation distance ΔS'.

Alternatively, in the above 2D/3D switchable display device provided in the embodiments of the present disclosure, said control unit is used for:

calculating a translation multiple m according to the determined calculated translation distance ΔS' as well as $$m = \frac{\Delta S'}{\Delta X'},$$

wherein ΔX' is a width of a column of light-emitting pixels in the organic electroluminescent panel;

controlling the column regions of the organic electroluminescent panel to translate by m light-emitting pixels along the row direction if said translation multiple m is an integer; and if said translation multiple m is not an integer, rounding said translation multiple m to obtain m', and controlling the column regions of the organic electroluminescent panel to translate by m' light-emitting pixels along the row direction.

Alternatively, in the above 2D/3D switchable display device provided in the embodiments of the present disclosure, said backlight panel and said first liquid crystal display panel are fixed together by a frame sealant.

In the above 2D/3D switchable display device provided in the embodiments of the present disclosure, a second liquid crystal display panel is provided at a light emergent side of the first liquid crystal display panel. During 3D display, the second liquid crystal display panel is fully light-transmissive, so settings of the second liquid crystal display panel will not influence the effect of 3D display. During 2D display, since the liquid crystal molecules in the second liquid crystal display panel are arranged irregularly and owing to the characteristic of birefringence of the liquid crystal molecules, light emitted from the first liquid crystal display panel are strongly scattered when passing through the liquid crystal molecules in the liquid crystal layer of the second liquid crystal display panel. Light emitted from the first liquid crystal display panel are scattered, so the left and right eyes can simultaneously see image information of all pixels in the first liquid crystal display panel, thereby realizing full resolution during 2D display and solving the problem of halved resolution in the prior art.

DETAILED DESCRIPTION OF THE EMBODIMENTS

To further clarify the object, technical solution and advantages of the present disclosure, a more particular description of the present disclosure will be rendered with reference to the drawings. Obviously, the described embodiments are merely some instead of all of the embodiments of the present disclosure. All other embodiments that can be obtained by those skilled in the art on the basis of the embodiments in the present disclosure without using inventive skills shall fall into the protection scope of the present disclosure.

Shapes and sizes of the components shown in the drawings do not reflect the true proportion, but they only intend to schematically depict the present disclosure.

Figure 2:
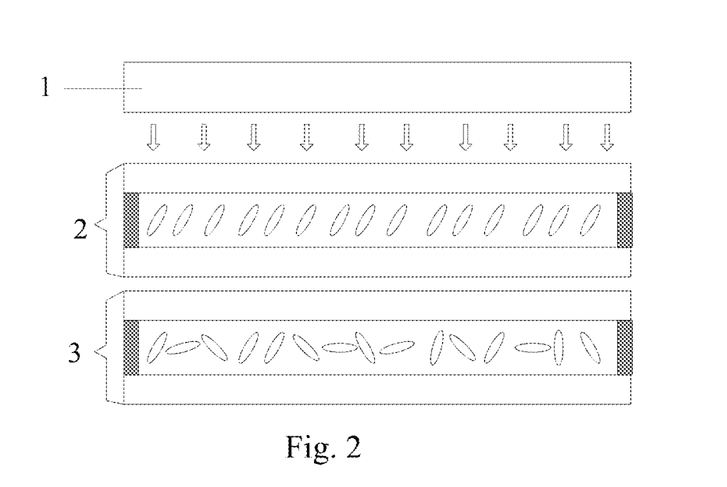
FIG. 2 is a structural diagram of a 2D/3D switchable display device provided in an embodiment of the present disclosure.

A 2D/3D switchable display device provided in an embodiment of the present disclosure, as shown in FIG. 2, comprises: a backlight panel 1, a first liquid crystal display panel 2 at a light emergent side of the backlight panel 1, and a black-and-white second liquid crystal display panel 3 at a light emergent side of the first liquid crystal display panel 2;

wherein, during 3D display, the second liquid crystal display panel 3 is fully light-transmissive; and during 2D display, liquid crystal molecules in the second liquid crystal display panel 3 are arranged irregularly so as to scatter light emitted from the first liquid crystal display panel 2.

In the above 2D/3D switchable display device provided in the embodiments of the present disclosure, a second liquid crystal display panel is provided at a light emergent side of the first liquid crystal display panel. During 3D display, the second liquid crystal display panel is fully light-transmissive, so settings of the second liquid crystal display panel will not influence the effect of 3D display. During 2D display, since the liquid crystal molecules in the second liquid crystal display panel are arranged irregularly and owing to the characteristic of birefringence of the liquid crystal molecules, light emitted from the first liquid crystal display panel are strongly scattered when passing through the liquid crystal molecules in the liquid crystal layer of the second liquid crystal display panel. Light emitted from the first liquid crystal display panel are scattered, so the left and right eyes can simultaneously see image information of all pixels in the first liquid crystal display panel, thereby realizing full resolution during 2D display and solving the problem of halved resolution in the prior art.

It shall be noted that in the above 2D/3D switchable display device provided in the embodiments of the present disclosure, the "black-and-white" liquid crystal display panel refers to a liquid crystal display panel in which no color-resistance layer formed by color-resistance materials is provided. Besides, the term "fully light-transmissive" used in the context of the present disclosure means that the propagation direction of the light beam is not changed and no significant blocking or scattering exists.

Figure 3:
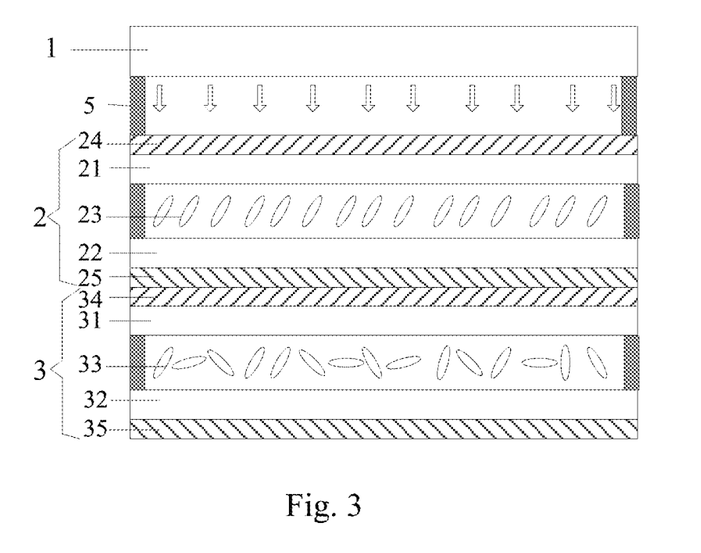
FIG. 3 is a specific structural diagram of a 2D/3D switchable display device provided in an embodiment of the present disclosure.

Further, in the above 2D/3D switchable display device provided in the embodiments of the present disclosure, as shown in FIG. 3, the first liquid crystal display panel 2 comprises a first substrate 21 and a second substrate 22 arranged facing each other, and a first liquid crystal layer 23 sandwiched between the first substrate 21 and the second substrate 22; the second liquid crystal display panel 3 comprises a third substrate 31 and a fourth substrate 32 arranged facing each other, and a second liquid crystal layer 33 sandwiched between the third substrate 31 and the fourth substrate 32; wherein the first substrate 21 is at a side near the backlight panel 1; the third substrate 31 is at a side near the second substrate 22; the first liquid crystal display panel 2 further comprises a first polarizer 24 at a side of the first substrate 21 facing the backlight panel 1, and a second polarizer 25 at a side of the second substrate 22 facing the third substrate 31; and the second liquid crystal display panel 3 further comprises a third polarizer 34 at a side of the third substrate 31 facing the second substrate 22, and a fourth polarizer 35 at a side of the fourth substrate 32 facing away from the second liquid crystal layer 33.

In a specific implementation, the first substrate may be an array substrate, and the second substrate may be an opposite substrate or a color film substrate. Of course, the first substrate may also be an opposite substrate or a color film substrate, and the second substrate may be an array substrate, which is not limited herein.

Likewise, in a specific implementation, the third substrate may be an array substrate, and the fourth substrate may be an opposite substrate or a color film substrate. Of course, the third substrate may also be an opposite substrate or a color film substrate, and the fourth substrate may be an array substrate, which is not limited herein.

Figure 4:
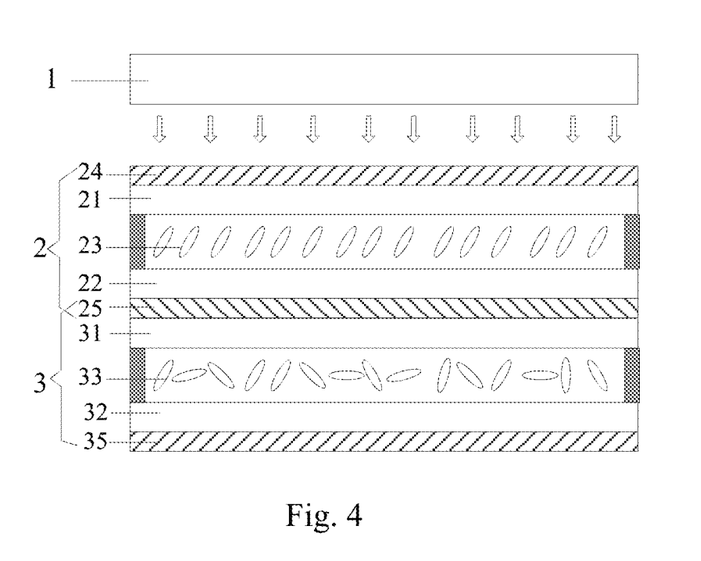
FIG. 4 is a specific structural diagram of a 2D/3D switchable display device provided in another embodiment of the present disclosure.

Alternatively, in order to reduce the thickness of the 2D/3D switchable display device, in the above 2D/3D switchable display device provided in the embodiments of the present disclosure, as shown in FIG. 4, the second polarizer 25 and the third polarizer 34 are the same polarizer; namely, the first liquid crystal display panel 2 and the second liquid crystal display panel 3 share the same polarizer. As shown in FIG. 4, the first liquid crystal display panel 2 and the second liquid crystal display panel 3 share the second polarizer 25 in the first liquid crystal display panel 2. Then it is unnecessary to provide a third polarizer 34 as shown in FIG. 3 in the second liquid crystal display panel 3, and the second polarizer 25 is used for the second liquid crystal display panel 3. Of course, the third polarizer 34 in the second liquid crystal display panel 3 can be shared, then it is unnecessary to provide the second polarizer 25 in the first liquid crystal display panel 2, and the third polarizer 34 as shown in FIG. 3 is used for the first liquid crystal display panel 2, which is not limited herein.

Further, in the above 2D/3D switchable display device provided in the embodiments of the present disclosure, as shown in FIG. 3, the backlight panel 1 and the first liquid crystal display panel 2 can be fixed together by a frame sealant 5, which is not limited herein.

Alternatively, in the above 2D/3D switchable display device provided in the embodiments of the present disclosure, as shown in FIGS. 5a-5d, light emitted from the backlight panel 1 is white light, the first liquid crystal display panel 2 is a black-and-white liquid crystal display panel, and the first liquid crystal display panel 2 has a plurality of pixels arranged in a matrix, each pixel including N sub-pixels arranged along the row direction, wherein N is an integer greater than or equal to 3; the 2D/3D switchable display device further comprises a beam splitter 4; wherein as shown in FIGS. 5a-5d, the beam splitter 4 is disposed between the first liquid crystal layer 23 and the backlight panel 1; light emitted from the backlight panel 1 is split into light of N colors after passing through the beam splitter 4, and the light of each color is transmitted to one sub-pixel of the first liquid crystal display panel 2.

The above 2D/3D switchable display device provided in the embodiments of the present disclosure employs the "black-and-white" first liquid crystal display panel. That is, no color-resistance layer formed by color-resistance materials is provided in the first liquid crystal display panel, and a beam splitter is provided between the backlight panel and the liquid crystal layer of the first liquid crystal display panel. The beam splitter is used to replace the color-resistance layer in the existing liquid crystal display panel so as to split white light of the backlight panel into light of different colors, thereby realizing color display. The splitting efficiency of the beam splitter can usually exceed 30%, while the splitting efficiency of the color-resistance layer is usually around 10%, so using of the beam splitter can reduce light loss of the first liquid crystal display panel and increase light-transmittance of the 2D/3D switchable display device, thereby reducing power consumption of the 2D/3D switchable display device.

In a specific implementation, in the above 2D/3D switchable display device provided in the embodiments of the present disclosure, N may be equal to 3. The three colors of light are red light, green light and blue light, respectively.

Figure 6:
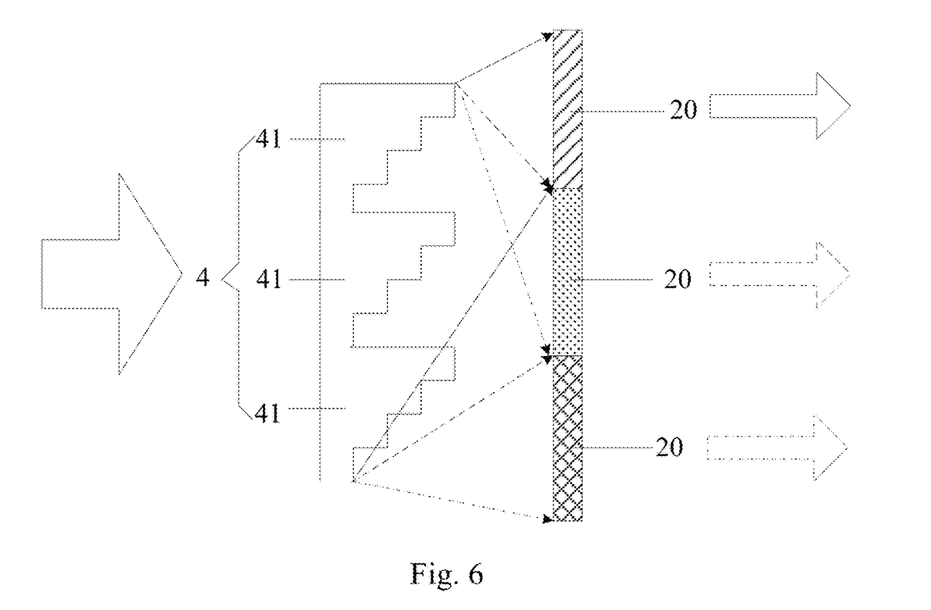
FIG. 6 is a schematic drawing of the beam splitting principle of a beam splitter provided in an embodiment of the present disclosure.

In a specific implementation, in the above 2D/3D switchable display device provided in the embodiments of the present disclosure, as shown in FIG. 6, the beam splitter 4 may consist of several step structures 41 that are in periodic distribution. The white light passing through the step structures 41 will be split into light of different colors because light of different wavelengths in white light will have different refraction angles after passing through said step structures. Light of each color is transmitted onto one sub-pixel 20 in the first liquid crystal display panel 2, thereby realizing color display. The specific structure and principle of the beam splitter are the same as those of existing beam splitters, so they are not elaborated herein.

Figure 5A:
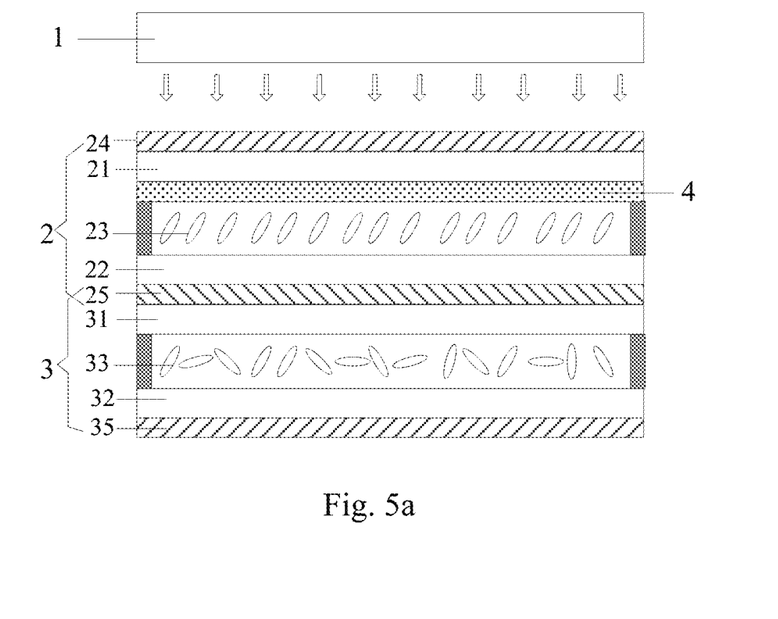
FIGS. 5a-5d are schematic drawings of positions of a beam splitter in the 2D/3D switchable display device provided in the embodiment of the present disclosure.

In a specific implementation, in the above 2D/3D switchable display device provided in the embodiment of the present disclosure, as shown in FIG. 5a, said beam splitter 4 is at a side of the first substrate 21 facing the first liquid crystal layer 23.

Figure 5B:
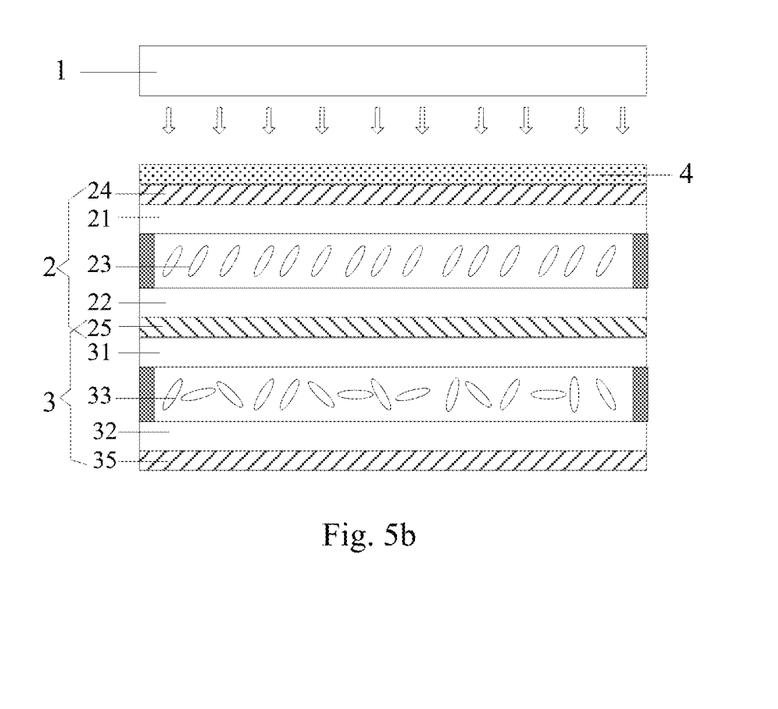

Alternatively, in a specific implementation, in the above 2D/3D switchable display device provided in the embodiments of the present disclosure, as shown in FIG. 5b, said beam splitter 4 is at a side of the first polarizer 24 facing the backlight panel 1.

Figure 5C:
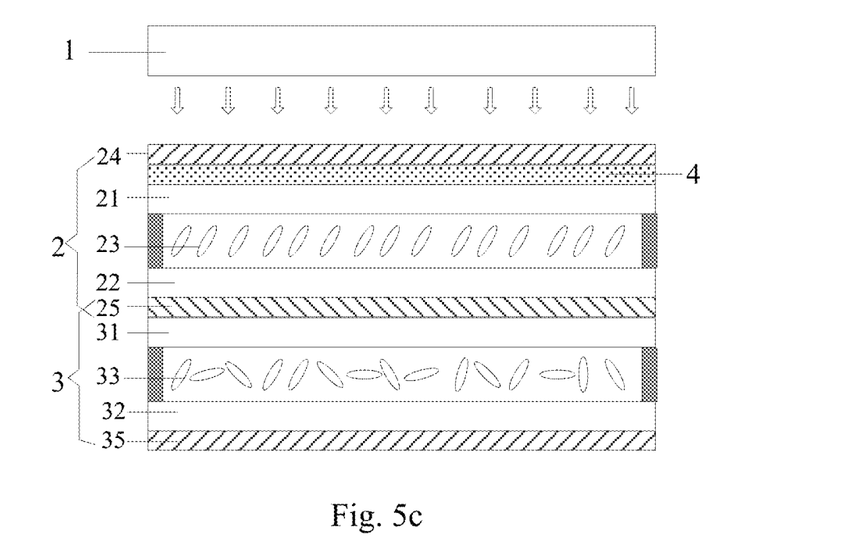

Alternatively, in a specific implementation, in the above 2D/3D switchable display device provided in the embodiments of the present disclosure, as shown in FIG. 5c, said beam splitter 4 is between the first polarizer 24 and the first substrate 21.

Figure 5D:
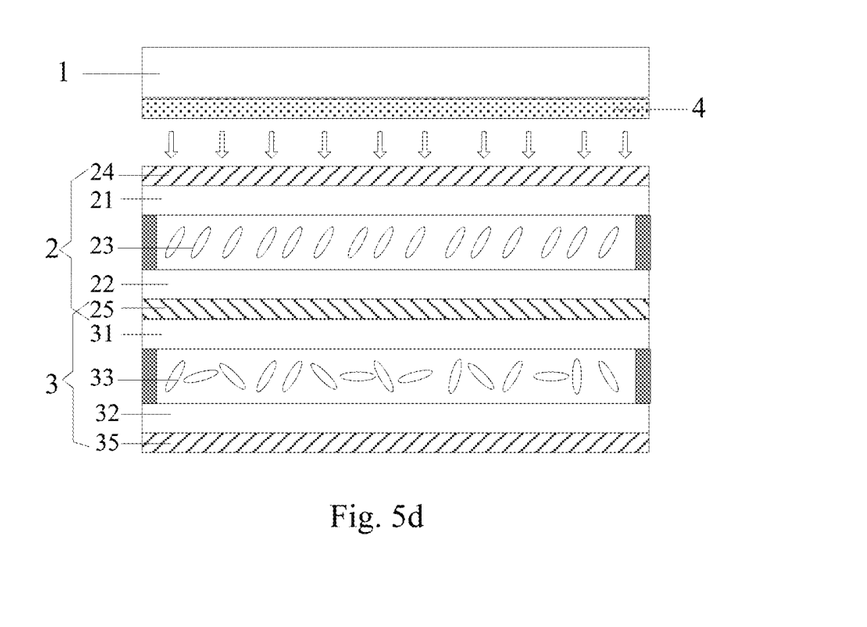

Alternatively, in a specific implementation, in the above 2D/3D switchable display device provided in the embodiments of the present disclosure, as shown in FIG. 5d, said beam splitter 4 is at a side of the backlight panel 1 facing the first liquid crystal display panel 2.

Figure 7:
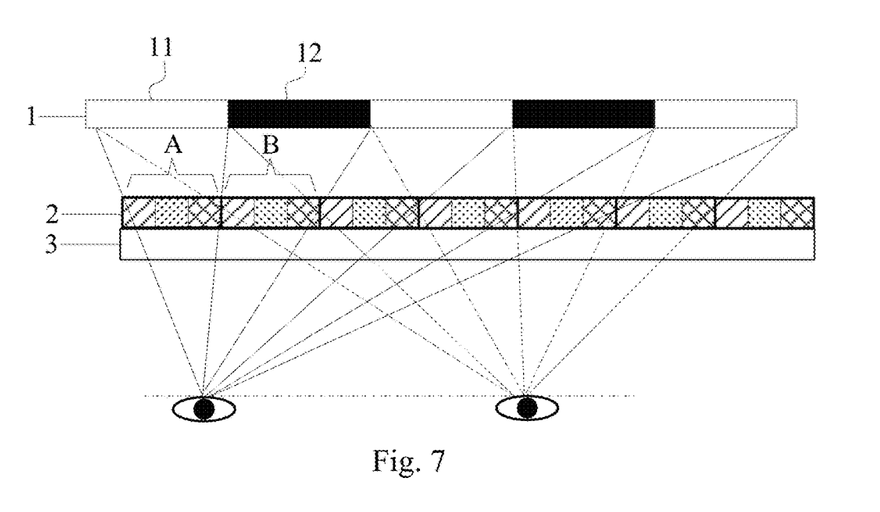
FIG. 7 is a schematic drawing of the principle of the 2D/3D switchable display device provided in the embodiment of the present disclosure during 3D display.

Alternatively, in the above 2D/3D switchable display device provided in the embodiments of the present disclosure, as shown in FIG. 7, said backlight panel 1 is an organic electroluminescent panel; wherein said organic electroluminescent panel has a plurality of light-emitting pixels arranged in a matrix, a region corresponding to at least one column of adjacent light-emitting pixels is considered as a column region (column regions 11 and 12 as shown in FIG. 7), and light-emitting column regions 11 and shading column regions 12 are arranged alternately in said organic electroluminescent panel; during display, light-emitting pixels corresponding to said light-emitting column regions 11 emit light while light-emitting pixels corresponding to shading column regions do not emit light.

As shown in FIG. 7, in the first liquid crystal display panel 2, a region corresponding to at least one column of pixels is considered as a monocular pixel region, and left-eye pixel regions A and right-eye pixel regions B are arranged alternately; as shown in FIG. 7, during 2D display, pixels corresponding to the left-eye pixel regions A display the same image information as pixels corresponding to the adjacent right-eye pixel regions B; during 3D display, pixels corresponding to the left-eye pixel regions A display left-eye image information, while pixels corresponding to the right-eye pixel regions B display right-eye image information.

Light emitted by the light-emitting column regions 11 in said organic electroluminescent panel irradiates towards a direction corresponding to the left eye of a person through the left-eye pixel regions A of the first liquid crystal display panel 2 and irradiates towards a direction corresponding to the right eye of a person through the right-eye pixel regions B of the first liquid crystal display panel 2.

In a specific implementation, during 3D display, the second liquid crystal display panel is in a fully-transmissive state, so light emitted by the light-emitting column regions in the organic electroluminescent panel will not change the emission directions after passing through the left-eye pixel regions and right-eye pixel regions of the first liquid crystal display panel, and they still irradiate towards the direction corresponding to the left eye of a person and the direction corresponding to the right eye of a person, respectively.

During 2D display, the liquid crystal molecules in the second liquid crystal display panel are irregularly arranged, so light emitted from the light-emitting column regions in the organic electroluminescent panel can not only irradiate towards the direction corresponding to the left eye of a person after passing through the left-eye pixel regions in the first liquid crystal display panel, but also scatter to the right eye direction. Likewise, light emitted from the light-emitting column regions in the organic electroluminescent panel can not only irradiate towards the direction corresponding to the right eye of a person after passing through the right-eye pixel regions in the first liquid crystal display panel, but also scatter to the left eye direction, thus increasing the resolution of 2D display.

In a specific implementation, a distance between the first liquid crystal display panel and the backlight panel (for example, but not limited to, the organic electroluminescent panel) can be adjusted, such that light emitted by the light-emitting column regions in the organic electroluminescent panel irradiates towards the direction corresponding to the left eye of a person after passing through the left-eye pixel regions in the first liquid crystal display panel, and irradiates towards the direction corresponding to the right eye of a person after passing through the right-eye pixel regions in the first liquid crystal display panel. The specific principle thereof is the same as the principle of existing 3D display devices, so it will not be elaborated herein.

In the above 2D/3D switchable display device provided in the embodiments of the present disclosure, the organic electroluminescent panel controls the displayed brightness, the beam splitter controls the displayed chroma, the first liquid crystal display panel controls rotation of liquid crystal molecules in the liquid crystal layer so as to control the degree of light transmittance of light of the organic electroluminescent panel after passing through the beam splitter and the liquid crystal layer, i.e. the first liquid crystal display panel controls the displayed gray scale. Therefore, by controlling the light-emitting column regions of the organic electroluminescent panel and controlling the displayed content on the first liquid crystal display panel, switching between 2D display and 3D display can be realized. When using the above 2D/3D switchable display device for 3D display, a good 3D effect can be seen at a fixed position; when the human eyes move, crosstalk may occur, which will reduce and even cancel the 3D effect.

Therefore, alternatively, in order to solve the crosstalk problem caused by human eye movement, the above 2D/3D switchable display device provided in the embodiments of the present disclosure further comprises a human eye tracking and control module; wherein, said human eye tracking and control module controls the monocular pixel regions of the first liquid crystal display panel to translate along a row direction, or controls the column regions of said organic electroluminescent panel to translate along a row direction according to a left-right translation distance of a target human eye.

Two specific embodiments are given below for illustration.

Embodiment 1

The human eye tracking and control module is used for controlling the monocular pixel regions of the first liquid crystal display panel to translate along a row direction according to a left-right translation distance of a target human eye, Alternatively, in the above 2D/3D switchable display device provided in the embodiments of the present disclosure, said human eye tracking and control module may comprise:

a human eye tracking unit for determining a calculated translation distance $\Delta S$ of a monocular pixel region in the first liquid crystal display panel according to a translation distance $\Delta P$ of the target human eye to the left or to the right as well as $$\frac{\Delta S}{\Delta P} = \frac{H}{L},$$

wherein L is a distance from said target human eye to said organic electroluminescent panel, H is a distance from a liquid crystal layer of said first liquid crystal display panel to said organic electroluminescent panel;

a control unit for controlling the monocular pixel regions of said first liquid crystal display panel to translate by an integral number of sub-pixels along the row direction consistent with a human eye moving direction according to the determined calculated translation distance $\Delta S$. Namely, when the human eye translates to the left, the monocular pixel regions of the first liquid crystal display panel translate to the left along the row direction, when the human eye translates to the right, the monocular pixel regions of the first liquid crystal display panel translate to the right along the row direction.

Alternatively, in the above 2D/3D switchable display device provided in the embodiments of the present disclosure, said control unit is used for:

calculating a translation multiple m according to the determined calculated translation distance $\Delta S$ as well as $$m = \frac{\Delta S}{\Delta X},$$

wherein $\Delta X$ is a width of a column of sub-pixels in the liquid crystal display panel;

controlling the monocular pixel regions of the first liquid crystal display panel to translate by m sub-pixels along the row direction if said translation multiple m is an integer; and if said translation multiple m is not an integer, rounding said translation multiple m to obtain m', and controlling the monocular pixel regions of the first liquid crystal display panel to translate by m' sub-pixels along the row direction.

Figure 8:
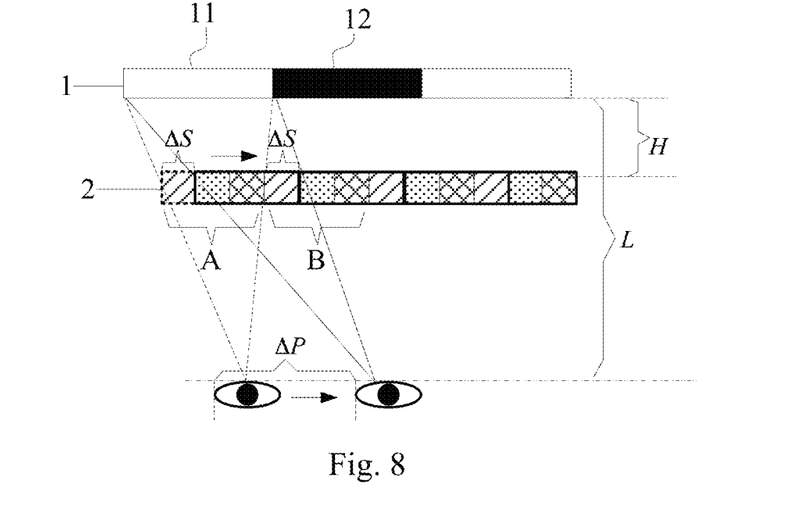
FIG. 8 is a schematic drawing of the principle of controlling movement of the monocular pixel regions in the first liquid crystal display panel in the 2D/3D switchable display device provided in the embodiment of the present disclosure during 3D display.

Specifically, an example of the target human eye translating to the right is described herein. As shown in FIG. 8 (in which the second liquid crystal display panel is not shown), when the target human eye translates to the right by a distance $\Delta P$, the distance $\Delta P$ by which the human eye translates to the right and the calculated translation distance $\Delta S$ of the monocular pixel regions (A and B) satisfy an equation of $$\frac{\Delta S}{\Delta P} = \frac{H}{L},$$

so the calculated translation distance $\Delta S$ of the monocular pixel regions (A and B) can be calculated. Since each monocular pixel region (A and B) in the first liquid crystal display panel 2 is a region corresponding to at least one column of pixels, when controlling the monocular pixel region (A and B) in the first liquid crystal display panel 2 to translate, the minimum unit for translation is one sub-pixel. Hence, only when the calculated translation distance ΔS equals to an integral multiple of the width ΔX of one column of sub-pixels in the first liquid crystal display panel 2, i.e. when the translation multiple m in $$m = \frac{\Delta S}{\Delta X}$$

is an integer, will the monocular pixel regions (A and B) in the first liquid crystal display panel 2 be controlled to translate by m sub-pixels to the right along the row direction, i.e. to translate by ΔS; when the translation multiple m is not an integer, the translation distance of the monocular pixel regions (A and B) shall be made to be an integral multiple of the width of the sub-pixel of the first liquid crystal display panel 2 and be closest to the calculated translation distance ΔS, so the translation multiple m is first rounded to obtain m', then the monocular pixel regions (A and B) in the first liquid crystal display panel 2 are controlled to translate to the right by m' sub-pixels along the row direction. FIG. 8 schematically illustrates the example that the translation multiple m is an integer.

Embodiment 2

Said human eye tracking and control module is used for controlling the column regions of the organic electroluminescent panel to translate along a row direction according to a left-right translation distance of a target human eye.

Alternatively, in the above 2D/3D switchable display device provided in the embodiments of the present disclosure, said human eye tracking and control module comprises:

a human eye tracking unit for determining a calculated translation distance ΔS' of a column region of the organic electroluminescent panel according to a translation distance ΔP of the target human eye to the left or to the right as well as $$\frac{\Delta S'}{\Delta P} = \frac{H}{L-H},$$

wherein L is a distance from said target human eye to said organic electroluminescent panel, H is a distance from a liquid crystal layer of said first liquid crystal display panel to said organic electroluminescent panel;

a control unit for controlling the column regions of said organic electroluminescent panel to translate by an integral number of light-emitting pixels along a row direction opposite to a human eye moving direction according to the determined calculated translation distance ΔS'.

Alternatively, in the above 2D/3D switchable display device provided in the embodiments of the present disclosure, said control unit is used for:

calculating a translation multiple m according to the determined calculated translation distance ΔS' as well $$m = \frac{\Delta S'}{\Delta X'},$$

as wherein ΔX' is a width of a column of light-emitting pixels in the organic electroluminescent panel;

controlling the column regions of the organic electroluminescent panel to translate by in light-emitting pixels along the row direction if said translation multiple m is an integer; and if said translation multiple m is not an integer, rounding said translation multiple m to obtain m', and controlling the column regions of the organic electroluminescent panel to translate by m' light-emitting pixels along the row direction.

Figure 9:
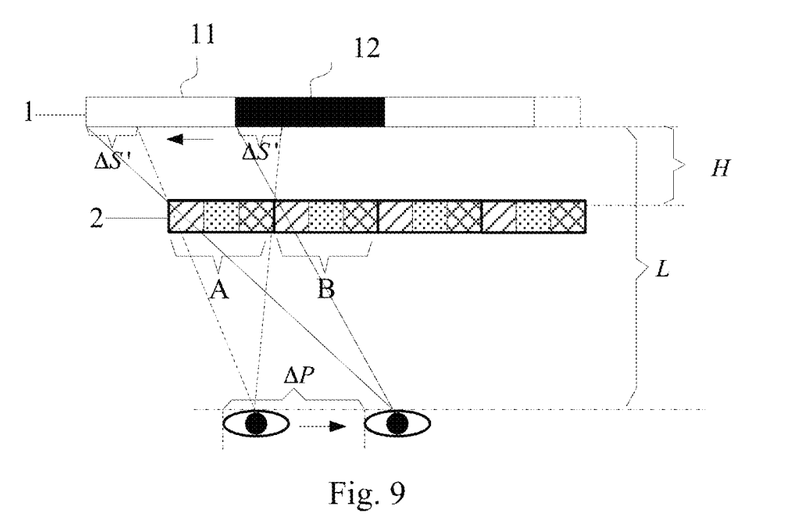
FIG. 9 is a schematic drawing of the principle of controlling movement of the column regions in the organic electroluminescent panel in the 2D/3D switchable display device provided in the embodiment of the present disclosure during 3D display.

An example of the target human eye translating to the right is described herein. As shown in FIG. 9 (in which the second liquid crystal display panel is not shown), when the target human eye translates to the right by a distance ΔP, the distance ΔP by which the human eye translates to the right and the calculated translation distance ΔS' of the column regions (11 and 12) satisfy an equation of $$\frac{\Delta S'}{\Delta P} = \frac{H}{L-H},$$

so the calculated translation distance ΔS' of the column regions (11 and 12) can be derived. Since each column region (11 and 12) in the backlight panel 1, i.e. the organic electroluminescent panel, is a region corresponding to at least one column of light-emitting pixels, when controlling the column regions (11 and 12) in the organic electroluminescent panel to translate, the minimum unit for translation is one light-emitting pixel. Hence, only when the calculated translation distance ΔS' equals to an integral multiple of the width ΔX' of one column of light-emitting pixels in the organic electroluminescent panel, i.e. when the translation multiple m in $$m = \frac{\Delta S'}{\Delta X'}$$

is an integer, will the column regions (11 and 12) in the organic electroluminescent panel be controlled to translate by m sub-pixels to the left along the row direction, i.e. to translate by ΔS; when the translation multiple m is not an integer, the translation distance of the column regions (11 and 12) shall be made to be an integral multiple of the width of the light-emitting pixel and be closest to the calculated translation distance ΔS', so the translation multiple m is first rounded to obtain m', then the column regions (11 and 12) in the organic electroluminescent panel are controlled to translate to the left by m' light-emitting pixels along the row direction. FIG. 9 schematically illustrates the example that the translation multiple m is an integer.

In a specific implementation, in the above 2D/3D switchable display device provided in the embodiments of the present disclosure, the human eye tracking unit in the human eye tracking and control module can be provided at a light emergent side of the second liquid crystal display panel, when the human eye tracking and control module controls the monocular pixel regions of the first liquid crystal display panel to translate along the row direction according to a left-right translation distance of the target human eye, the control unit can be integrated on a driver chip in the first liquid crystal display panel; when the human eye tracking and control module controls the column regions of the organic electroluminescent panel to translate along the row direction according to a left-right translation distance of the target human eye, the control unit can be integrated on a driver chip in the organic electroluminescent panel, which are not limited herein.

In the above 2D/3D switchable display device provided in the embodiments of the present disclosure, the second liquid crystal display panel is provided at a light emergent side of the first liquid crystal display panel. During 3D display, the second liquid crystal display panel is fully light-transmissive, so settings of the second liquid crystal display panel will not influence the effect of 3D display. During 2D display, since the liquid crystal molecules in the second liquid crystal display panel are arranged irregularly and owing to the characteristic of birefringence of the liquid crystal molecules, light emitted from the first liquid crystal display panel are strongly scattered when passing through the liquid crystal molecules in the liquid crystal layer of the second liquid crystal display panel. Light emitted from the first liquid crystal display panel are scattered, so the left and right eyes can simultaneously see image information of all pixels in the first liquid crystal display panel, thereby realizing full resolution during 2D display and solving the problem of halved resolution in the prior art.

Obviously, those skilled in the art can make various modifications and changes to the present disclosure without departing from the spirit and scope of the present disclosure. Therefore, if such modifications and changes to the present disclosure fall into the scope defined by the appended claims and the equivalents thereof, then the present disclosure also intends to include such modifications and changes.

What is claimed is:

1. A 2D/3D switchable display device, comprising: a backlight panel, a first liquid crystal display panel at a light emergent side of the backlight panel, and a black-and-white second liquid crystal display panel at a light emergent side of the first liquid crystal display panel;
    wherein, during 3D display, the second liquid crystal display panel is fully light-transmissive; and
    during 2D display, liquid crystal molecules in the second liquid crystal display panel are arranged irregularly so as to scatter light emitted from the first liquid crystal display panel,
    wherein the first liquid crystal display panel comprises a first substrate and a second substrate arranged facing each other, and a first liquid crystal layer sandwiched between the first substrate and the second substrate; the second liquid crystal display panel comprises a third substrate and a fourth substrate arranged facing each other, and a second liquid crystal layer sandwiched between the third substrate and the fourth substrate;
    wherein the first substrate is at a side near the backlight panel; the third substrate is at a side near the second substrate,
    wherein light emitted from the backlight panel is white light, the first liquid crystal display panel is a black-and-white liquid crystal display panel, and the first liquid crystal display panel has a number of pixels arranged in a matrix, each pixel including N sub-pixels arranged along a row direction, wherein N is an integer greater than or equal to 3; said 2D/3D switchable display device further comprises a beam splitter;
    wherein the beam splitter is disposed between the first liquid crystal layer and the backlight panel; light emitted from the backlight panel passes through the beam splitter and is split into light of N colors, and light of each color is transmitted to one sub-pixel of the first liquid crystal display panel, and
    wherein the beam splitter consists of several step structures that are in periodic distribution.

2. The 2D/3D switchable display device according to claim 1, wherein
    the first liquid crystal display panel further comprises: a first polarizer at a side of the first substrate facing the backlight panel, and a second polarizer at a side of the second substrate facing the third substrate;
    the second liquid crystal display panel further comprises: a third polarizer at a side of the third substrate facing the second substrate, and a fourth polarizer at a side of the fourth substrate facing away from the second liquid crystal layer.

3. The 2D/3D switchable display device according to claim 2, wherein the second polarizer and the third polarizer are the same polarizer.

4. The 2D/3D switchable display device according to claim 3, wherein said backlight panel is an organic electroluminescent panel; wherein
    said organic electroluminescent panel has a plurality of light-emitting pixels arranged in a matrix, a region corresponding to at least one column of adjacent light-emitting pixels is considered as a column region, and light-emitting column regions and shading column regions are arranged alternately in said organic electroluminescent panel; during display, light-emitting pixels corresponding to said light-emitting column regions emit light while light-emitting pixels corresponding to said shading column regions do not emit light;
    in the first liquid crystal display panel, a region corresponding to at least one column of pixels is considered as a monocular pixel region, and left-eye pixel regions and right-eye pixel regions are arranged alternately; during 2D display, pixels corresponding to the left-eye pixel regions display the same image information as pixels corresponding to the adjacent right-eye pixel regions; during 3D display, pixels corresponding to the left-eye pixel regions display left-eye image information, while pixels corresponding to the right-eye pixel regions display right-eye image information;
    light emitted by the light-emitting column regions in said organic electroluminescent panel irradiate towards a direction corresponding to the left eye of a person through the left-eye pixel regions of the first liquid crystal display panel and irradiate towards a direction corresponding to the right eye of a person through the right-eye pixel regions of the first liquid crystal display panel.

5. The 2D/3D switchable display device according to claim 2, wherein said backlight panel is an organic electroluminescent panel; wherein
    said organic electroluminescent panel has a plurality of light-emitting pixels arranged in a matrix, a region corresponding to at least one column of adjacent light-emitting pixels is considered as a column region, and light-emitting column regions and shading column regions are arranged alternately in said organic electroluminescent panel; during display, light-emitting pixels corresponding to said light-emitting column regions emit light while light-emitting pixels corresponding to said shading column regions do not emit light;
    in the first liquid crystal display panel, a region corresponding to at least one column of pixels is considered as a monocular pixel region, and left-eye pixel regions and right-eye pixel regions are arranged alternately;

during 2D display, pixels corresponding to the left-eye pixel regions display the same image information as pixels corresponding to the adjacent right-eye pixel regions; during 3D display, pixels corresponding to the left-eye pixel regions display left-eye image information, while pixels corresponding to the right-eye pixel regions display right-eye image information;

light emitted by the light-emitting column regions in said organic electroluminescent panel irradiate towards a direction corresponding to the left eye of a person through the left-eye pixel regions of the first liquid crystal display panel and irradiate towards a direction corresponding to the right eye of a person through the right-eye pixel regions of the first liquid crystal display panel.

6. The 2D/3D switchable display device according to claim 4, wherein said backlight panel is an organic electroluminescent panel; wherein said organic electroluminescent panel has a plurality of light-emitting pixels arranged in a matrix, a region corresponding to at least one column of adjacent light-emitting pixels is considered as a column region, and light-emitting column regions and shading column regions are arranged alternately in said organic electroluminescent panel; during display, light-emitting pixels corresponding to said light-emitting column regions emit light while light-emitting pixels corresponding to said shading column regions do not emit light;

in the first liquid crystal display panel, a region corresponding to at least one column of pixels is considered as a monocular pixel region, and left-eye pixel regions and right-eye pixel regions are arranged alternately; during 2D display, pixels corresponding to the left-eye pixel regions display the same image information as pixels corresponding to the adjacent right-eye pixel regions; during 3D display, pixels corresponding to the left-eye pixel regions display left-eye image information, while pixels corresponding to the right-eye pixel regions display right-eye image information;

light emitted by the light-emitting column regions in said organic electroluminescent panel irradiate towards a direction corresponding to the left eye of a person through the left-eye pixel regions of the first liquid crystal display panel and irradiate towards a direction corresponding to the right eye of a person through the right-eye pixel regions of the first liquid crystal display panel.

7. The 2D/3D switchable display device according to claim 1, wherein said beam splitter is at a side of the first substrate facing the first liquid crystal layer.

8. The 2D/3D switchable display device according to claim 7, wherein said backlight panel is an organic electroluminescent panel; wherein said organic electroluminescent panel has a plurality of light-emitting pixels arranged in a matrix, a region corresponding to at least one column of adjacent light-emitting pixels is considered as a column region, and light-emitting column regions and shading column regions are arranged alternately in said organic electroluminescent panel; during display, light-emitting pixels corresponding to said light-emitting column regions emit light while light-emitting pixels corresponding to said shading column regions do not emit light;

in the first liquid crystal display panel, a region corresponding to at least one column of pixels is considered as a monocular pixel region, and left-eye pixel regions and right-eye pixel regions are arranged alternately; during 2D display, pixels corresponding to the left-eye pixel regions display the same image information as pixels corresponding to the adjacent right-eye pixel regions; during 3D display, pixels corresponding to the left-eye pixel regions display left-eye image information, while pixels corresponding to the right-eye pixel regions display right-eye image information;

light emitted by the light-emitting column regions in said organic electroluminescent panel irradiate towards a direction corresponding to the left eye of a person through the left-eye pixel regions of the first liquid crystal display panel and irradiate towards a direction corresponding to the right eye of a person through the right-eye pixel regions of the first liquid crystal display panel.

9. The 2D/3D switchable display device according to claim 1, wherein said beam splitter is at a side of the first polarizer facing the backlight panel.

10. The 2D/3D switchable display device according to claim 9, wherein said backlight panel is an organic electroluminescent panel; wherein said organic electroluminescent panel has a plurality of light-emitting pixels arranged in a matrix, a region corresponding to at least one column of adjacent light-emitting pixels is considered as a column region, and light-emitting column regions and shading column regions are arranged alternately in said organic electroluminescent panel; during display, light-emitting pixels corresponding to said light-emitting column regions emit light while light-emitting pixels corresponding to said shading column regions do not emit light;

in the first liquid crystal display panel, a region corresponding to at least one column of pixels is considered as a monocular pixel region, and left-eye pixel regions and right-eye pixel regions are arranged alternately; during 2D display, pixels corresponding to the left-eye pixel regions display the same image information as pixels corresponding to the adjacent right-eye pixel regions; during 3D display, pixels corresponding to the left-eye pixel regions display left-eye image information, while pixels corresponding to the right-eye pixel regions display right-eye image information;

light emitted by the light-emitting column regions in said organic electroluminescent panel irradiate towards a direction corresponding to the left eye of a person through the left-eye pixel regions of the first liquid crystal display panel and irradiate towards a direction corresponding to the right eye of a person through the right-eye pixel regions of the first liquid crystal display panel.

11. The 2D/3D switchable display device according to claim 1, wherein said beam splitter is between the first polarizer and the first substrate.

12. The 2D/3D switchable display device according to claim 1, wherein said beam splitter is at a side of the backlight panel facing the first liquid crystal display panel.

13. The 2D/3D switchable display device according to claim 1, wherein said backlight panel is an organic electroluminescent panel; wherein said organic electroluminescent panel has a plurality of light-emitting pixels arranged in a matrix, a region corresponding to at least one column of adjacent light-emitting pixels is considered as a column region, and light-emitting column regions and shading column regions are arranged alternately in said organic electroluminescent panel; during display, light-emitting pixels corresponding to said light-emitting column regions emit light while light-emitting pixels corresponding to said shading column regions do not emit light;

in the first liquid crystal display panel, a region corresponding to at least one column of pixels is considered as a monocular pixel region, and left-eye pixel regions and right-eye pixel regions are arranged alternately; during 2D display, pixels corresponding to the left-eye pixel regions display the same image information as pixels corresponding to the adjacent right-eye pixel regions; during 3D display, pixels corresponding to the left-eye pixel regions display left-eye image information, while pixels corresponding to the right-eye pixel regions display right-eye image information;

light emitted by the light-emitting column regions in said organic electroluminescent panel irradiate towards a direction corresponding to the left eye of a person through the left-eye pixel regions of the first liquid crystal display panel and irradiate towards a direction corresponding to the right eye of a person through the right-eye pixel regions of the first liquid crystal display panel.

14. The 2D/3D switchable display device according to claim 13, which further comprises a human eye tracking and control module;
wherein, said human eye tracking and control module controls the monocular pixel regions of the first liquid crystal display panel to translate along a row direction or controls the column regions of said organic electroluminescent panel to translate along a row direction according to a left-right translation distance of a target human eye.

15. The 2D/3D switchable display device according to claim 14, wherein said human eye tracking and control module comprises:
a human eye tracking unit for determining a calculated translation distance ΔS of a monocular pixel region in the first liquid crystal display panel according to a translation distance ΔP of the target human eye to the left or to the right as well as $$\frac{\Delta S}{\Delta P} = \frac{H}{L},$$

wherein L is a distance from said target human eye to said organic electroluminescent panel, H is a distance from a liquid crystal layer of said first liquid crystal display panel to said organic electroluminescent panel;
a control unit for controlling the monocular pixel regions of said first liquid crystal display panel to translate by an integral number of sub-pixels along the row direction consistent with a human eye moving direction according to the determined calculated translation distance ΔS.

16. The 2D/3D switchable display device according to claim 15, wherein said control unit is used for:
calculating a translation multiple m according to the determined calculated translation distance ΔS as well as $$m = \frac{\Delta S}{\Delta X},$$

wherein ΔX is a width of a column of sub-pixels in the liquid crystal display panel;
controlling the monocular pixel regions of the first liquid crystal display panel to translate by m sub-pixels along the row direction if said translation multiple m is an integer; and
if said translation multiple m is not an integer, rounding said translation multiple m to obtain m', and controlling the monocular pixel regions of the first liquid crystal display panel to translate by m' sub-pixels along the row direction.

17. The 2D/3D switchable display device according to claim 14, wherein said human eye tracking and control module comprises:
a human eye tracking unit for determining a calculated translation distance ΔS' of a column region of the organic electroluminescent panel according to a translation distance ΔP of the target human eye to the left or to the right as well as $$\frac{\Delta S'}{\Delta P} = \frac{H}{L-H},$$

wherein L is a distance from said target human eye to said organic electroluminescent panel, H is a distance from a liquid crystal layer of said first liquid crystal display panel to said organic electroluminescent panel;
a control unit for controlling the column regions of said organic electroluminescent panel to translate by an integral number of light-emitting pixels along a row direction opposite to a human eye moving direction according to the determined calculated translation distance ΔS'.

18. The 2D/3D switchable display device according to claim 17, wherein said control unit is used for:
calculating a translation multiple m according to the determined calculated translation distance ΔS' as well as $$m = \frac{\Delta S'}{\Delta X'},$$

wherein ΔX' is a width of a column of light-emitting pixels in the organic electroluminescent panel;
controlling the column regions of the organic electroluminescent panel to translate by m light-emitting pixels along the row direction if said translation multiple m is an integer; and
if said translation multiple m is not an integer, rounding said translation multiple m to obtain m', and controlling the column regions of the organic electroluminescent panel to translate by m' light-emitting pixels along the row direction.

19. The 2D/3D switchable display device according to claim 1, wherein said backlight panel and said first liquid crystal display panel are fixed together by a frame sealant.

* * * * *